United States Patent [19]

Wakui et al.

[11] Patent Number: 5,470,636
[45] Date of Patent: Nov. 28, 1995

[54] MAGNETIC RECORDING MEDIUM AND METHOD OF PRODUCING IT

[75] Inventors: Yukio Wakui; Yoshiki Nishitani; Kenichi Miyazawa, all of Hamamatsu, Japan

[73] Assignee: Yamaha Corporation, Hamamatsu, Japan

[21] Appl. No.: 851,041

[22] Filed: Mar. 13, 1992

[30] Foreign Application Priority Data

| Mar. 15, 1991 | [JP] | Japan | 3-077018 |
| Jul. 19, 1991 | [JP] | Japan | 3-204762 |
| Feb. 24, 1992 | [JP] | Japan | 4-072894 |

[51] Int. Cl.$^6$ .............. G11B 5/66; B32B 3/10; B05D 5/12; C25D 5/00
[52] U.S. Cl. ............ 428/141; 428/65.6; 428/694 T; 428/694 TS; 428/694 TP; 428/694 TR; 428/694 ST; 428/694 SG; 428/156; 428/209; 428/409; 428/457; 428/469; 428/472.2; 428/472.3; 428/550; 428/613; 428/640; 428/650; 428/699; 428/702; 428/900; 204/192.1; 204/192.2; 427/127; 427/128; 427/129; 427/131; 427/261; 427/255.1; 205/105; 205/106; 205/112; 205/121; 205/124; 205/171; 205/172; 205/173; 205/187; 205/192; 205/199; 205/201; 205/206; 205/210; 205/214
[58] Field of Search ............. 428/64, 65, 694, 428/900, 694 T, 694 TS, 694 TP, 694 TR, 694 ST, 694 SG, 141, 156, 209, 409, 457, 469, 472.2, 472.3, 550, 613, 640, 650, 699, 702; 360/135; 427/129, 127, 131, 261, 255.1; 204/128, 192.1; 205/105, 106, 112, 121, 124, 171, 172, 173, 187, 192, 199, 201, 206, 210, 214

[56] References Cited

U.S. PATENT DOCUMENTS

| 4,689,260 | 4/1987 | Briska et al. | 428/161 |
| 4,698,251 | 10/1987 | Fukuda et al. | 428/64 |
| 4,761,330 | 4/1988 | Tokushima et al. | 428/312.8 |
| 5,047,274 | 9/1991 | Tsuya et al. | 428/64 |
| 5,082,709 | 1/1992 | Suzuki et al. | 428/64 |
| 5,093,173 | 3/1992 | Nakagawa et al. | 428/64 |
| 5,108,812 | 4/1992 | Takahashi et al. | 428/141 |

FOREIGN PATENT DOCUMENTS 430325  2/1992  Japan.

*Primary Examiner*—L. Kiliman
*Attorney, Agent, or Firm*—Spensley Horn Jubas & Lubitz

[57] ABSTRACT

A magnetic recording medium having a substrate made of aluminum or aluminum alloy and an anodic-oxide film, e.g., alumite film, formed by effecting the anodic oxidation process, wherein the surface of the alumite film has protruding portions formed in addition to micro-irregularities which are formed in response to the cell-pore structure of the alumite film and height of the protruding portions is higher than that of the micro-irregularity, and density of the protruding portions is ranging from $10^2$ to $10^7$ per one square millimeter, these protruding portions are formed by processing the alumite film in the fluorine-contained solution (e.g., hydrofluoric acid) or in solution containing one of the acid (HCl), base (NaOH) and strong-acid salt ($(NH_4)SO_4$), Cr film and magnetic film are sequentially formed on the alumite film by the sputtering process.

48 Claims, 14 Drawing Sheets

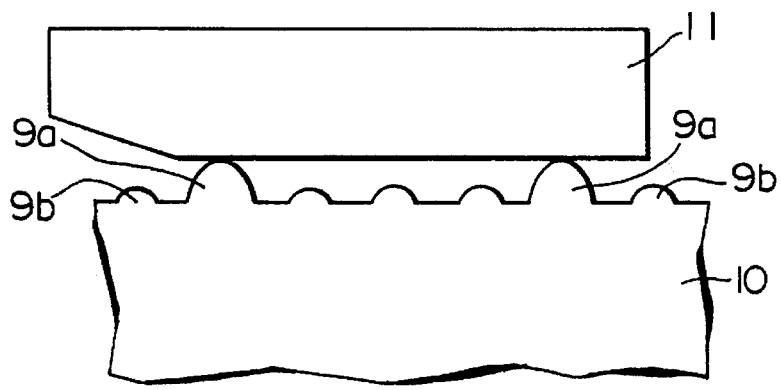
FIG. 13
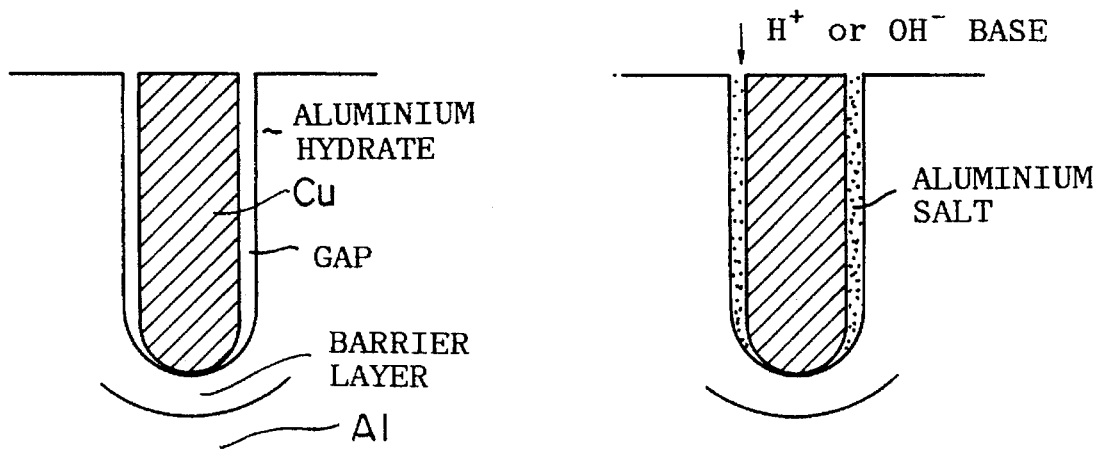
FIG. 14A
FIG. 14B
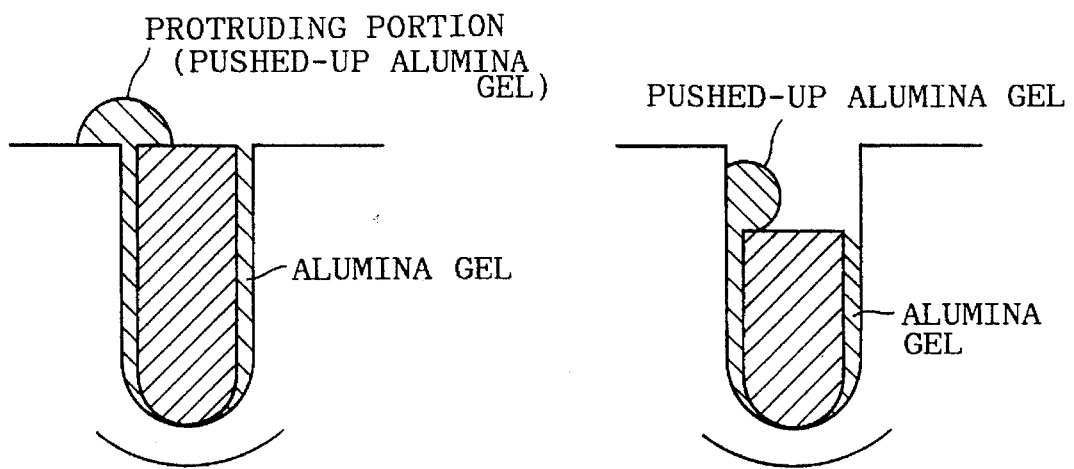
FIG. 14C
FIG. 14D

5,470,636

MAGNETIC RECORDING MEDIUM AND METHOD OF PRODUCING IT

BACKGROUND OF THE INVENTION

1. Field of the Invention

The present invention relates to a magnetic recording medium and a method of producing it which is suitable for use in a hard-disk unit.

2. Prior Art

In general, in order to raise the recording density of the magnetic recording medium to be used in the hard-disk unit, it is preferable that a gap (or space) between the magnetic recording medium and magnetic head is relatively small. For this reason, the surface of the magnetic recording medium must be formed smoothly. However, if the surface of the magnetic recording medium is extremely smooth, there occurs a head-absorption phenomenon in which the magnetic head is absorbed toward the magnetic recording medium in its operation, which may cause a head crash. In order to avoid such phenomenon, micro-irregularities are formed on the surface of the magnetic recording medium.

As the conventional methods of forming the micro-irregularities on the surface of the magnetic recording medium, there are two methods as follows.

(1) In the first method (which is disclosed in Japanese Patent Laid-Open Publication No. 1-165025), the anodic oxidation process is effected on Al or Al alloy substrate (i.e., aluminium substrate) so as to form the anodic-oxide film (e.g., alumite film). By use of the so-called "cell-pore structure" of the alumite film, non-magnetic material is filled into each cell-pore. Then, by effecting the etching process on the alumite film, the non-magnetic material is protruded from the surface of the alumite film, thus forming the micro-irregularities.

(2) In the second method (which is disclosed in Japanese Patent Laid-Open Publication No. 2-58729), particulates at relatively low density are adhered on the aluminum substrate on which Ni-P metal-plating film is formed, thus forming the micro-irregularities.

However, the above-mentioned, conventional methods of producing the magnetic recording media suffer from the following drawbacks. The foregoing first method is effective when avoiding the head-absorption phenomenon. However, in the magnetic recording medium which is produced according to the first method, the micro-irregularities must be formed at relatively high density, and as illustrated in FIG. 1, a contact area formed between a magnetic recording medium 10a and a head slider 11 must be relatively large. For these reasons, the first method is not so effective when reducing frictional coefficient μ between the magnetic head and magnetic recording medium 10a in Contact-Start-Stop (i.e., CSS) operations. In the CSS testing operation, the magnetic head is forced to be in contact with the magnetic recording medium. The characteristics of the magnetic recording medium under the CSS operations are called "CSS characteristics". Normally, the frictional coefficient μ is required to be lower than "0.5" after performing the CSS operations by twenty thousand times. However, in the magnetic recording medium which is produced according to the first method, it is difficult to satisfy such requirement.

In the second method, it is difficult to control the sizes and density of the micro-irregularities to be formed on the magnetic recording medium.

SUMMARY OF THE INVENTION

It is accordingly a primary object of the present invention to provide a method of producing a magnetic recording medium of which CSS characteristics are improved.

In an aspect of the present invention, there is provided a magnetic recording medium in which the micro-irregularities are formed on the surface of the anodic-oxide film in response to the cell-pore structure of the anodic-oxide film, and further, other protruding portions are formed. Each of these protruding portions has a height which is higher than that of each of the micro-irregularities, and density of the protruding portions ranges from $10^2$ to $10^7$ per square millimeter. Preferably, diameter of the protruding portion is equal to or lower than 0.7 μm.

The present invention also offers a method of producing the above magnetic recording medium which contains the following three steps. In first step, the anodic oxidation process is effected on the substrate, of which surface is made of Al or Al alloy at least, so as to form the anodic-oxide film. In second step, this anodic-oxide film is polished so that its surface is smoothed. In third step, the foregoing anodic-oxide film is treated by use of a fluorine-containing liquid or gas.

The above-mentioned fluorine-containing liquid can be replaced by a liquid which contains any one of acid, base and strong-acid salt.

BRIEF DESCRIPTION OF THE DRAWINGS

Further objects and advantages of the present invention will be apparent from the following description, reference being had to the accompanying drawings wherein the preferred embodiments of the present invention are clearly shown.

In the drawings:

FIG. 13 is a sectional view illustrating the relationship between the head slider and the magnetic disk according to another embodiment of the present invention;

FIGS. 14A to 14D are drawings showing the mechanism of forming the core of the protruding portion;

DESCRIPTION OF THE PREFERRED EMBODIMENTS

Figure 1:
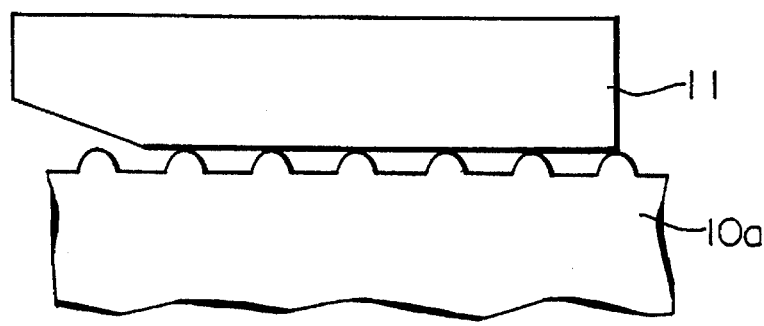
FIG. 1 is a sectional view illustrating the relationship between the head slider and the conventional magnetic recording medium.

[A] Fundamental Concept of the Present Invention

We, the inventors of the present invention, have performed several kinds of experiments and studies in order to obtain a magnetic recording medium having superior CSS characteristics. Through these experiments and studies, we reach a conclusion that the protruding portions must be formed on the substrate surface in order to avoid the foregoing head-absorption phenomenon. In addition, the density of them must be lower than that of the micro-irregularities which are formed in response to the foregoing cell-pore structure of the anodic-oxide film. By forming such protruding portions, it is possible to improve the CSS characteristics of the magnetic recording medium.

In the magnetic recording medium according to the present invention, the protruding portions are formed on the surface of the anodic-oxide film in the density ranging from $10^2$ to $10^7$ per square millimeter, and the height of them is higher than that of the micro-irregularities which are formed in response to the cell-pore structure of the anodic-oxide film. Thus, it is possible to reduce the contact area between the head slider and magnetic recording medium. In other words, it is possible to reduce the frictional coefficient between the magnetic head and magnetic recording medium in the CSS operation. Therefore, the CSS characteristics can be improved.

The density of the protruding portions must be set in a range from $10^2$ to $10^7$ per square millimeter. If the density becomes lower than $10^2$ per square millimeter, a heavy load is imparted to the protruding portion which supports the magnetic head. If the density exceeds $10^7$ per square millimeter, the CSS characteristics are deteriorate. Therefore, the density of the protruding portions must be set in a range from $10^2$ to $10^7$ per square millimeter, preferably, in a range from $10^4$ to $10^6$ per square millimeter.

In addition, diameter of the protruding portion must be smaller than 0.7 μm, preferably, in a range from 0.5 μm to 0.7 μm. If the diameter of the protruding portion exceeds 0.7 μm, which means that the protruding portion becomes larger than the predetermined size (e.g., 1 μm×12 μm) required for recording one-bit signal, the magnetic recording characteristic deteriorates. Further, the height of the protruding portion must be lower than 300 Å. If the height exceeds 300 Å, the head flying characteristic deteriorates.

Under the above-mentioned conditions, we have made several kinds of experiments and studies about the method how to form the protruding portions. As a result, we have found the following method. This method employs the Al or Al alloy substrate, or another substrate in which Al or Al alloy layer is formed on the glass bed. By effecting the foregoing anodic oxidation process on this substrate, the anodic-oxide film (i.e., alumite film) is formed on the surface of the substrate. By treating this anodic-oxide film by use of the fluorine-containing liquid or gas, it is possible to form the protruding portions having the foregoing size and density in the process of forming the magnetic film and the like. Herein, it is possible to explain the mechanism of forming the protruding portions by use of the liquid in which the fluorine-containing compound is dissolved or gas which contains the fluorine-contained compound in conjunction with FIGS. 2A, 2B, 3A, 3B, 4A, 4B.

Figure 2A:
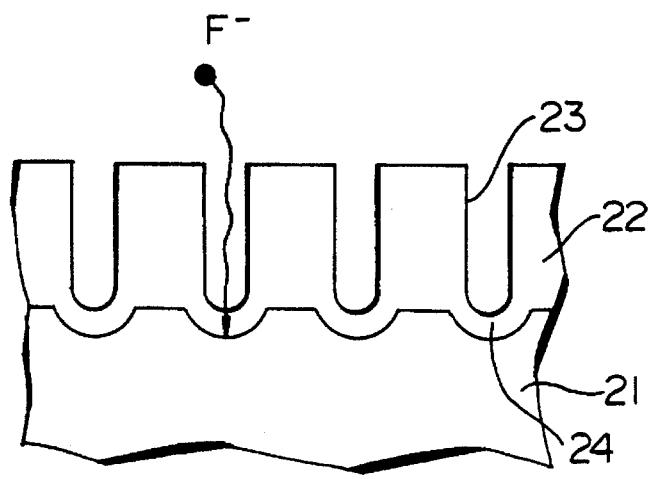
FIGS. 2A, 2B, 3A, 3B, 4A, 4B are sectional views each illustrating the process of forming the core for the protruding portion.
Figure 2B:
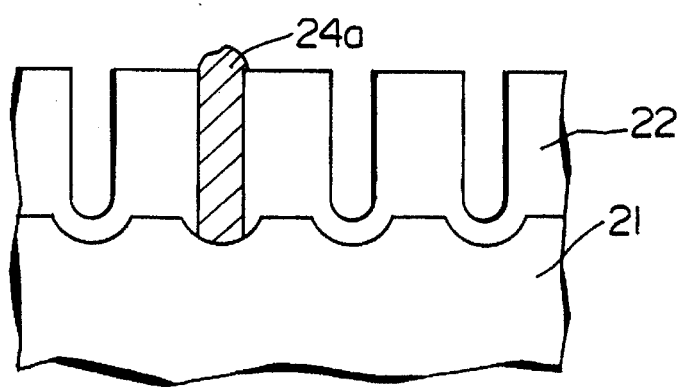

As shown in FIGS. 2A, 2B, the fluorine ($F^-$) reaches an aluminium substrate 21 via a pore 23 and a barrier layer 24 of an anodic-oxide film 22. Then, Al reacts with $F^-$, so that Al fluoride 24a is produced. This Al fluoride 24a protrudes onto the surface of the anodic-oxide film 22. This Al fluoride 24a may function as the core to be used when forming the protruding portions in the process of forming the magnetic film etc.

Figure 3A:
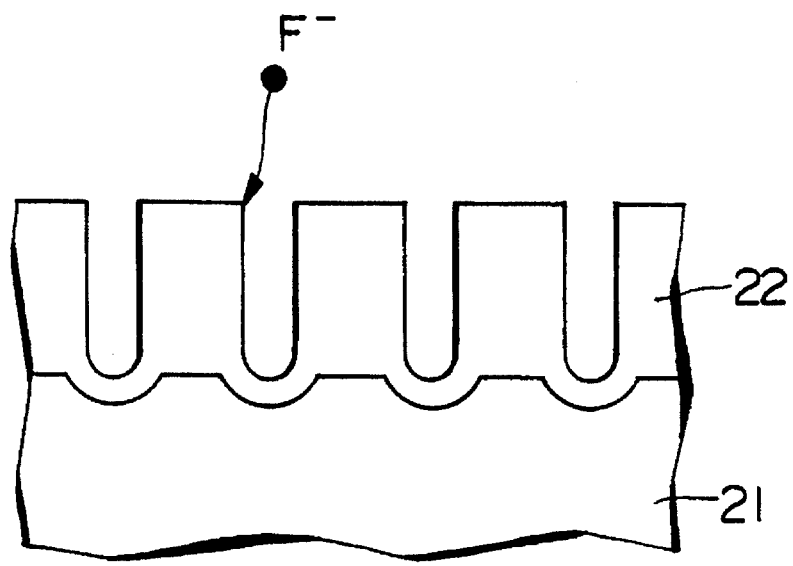
Figure 3B:
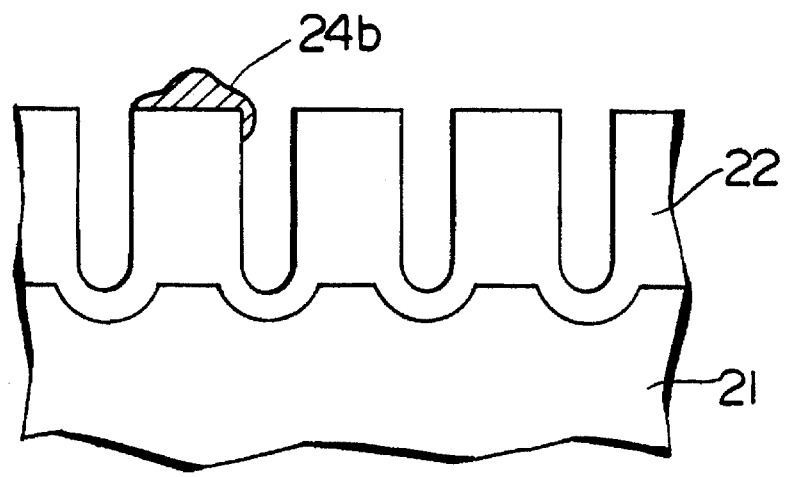

As shown in FIGS. 3A, 3B, the fluorine ($F^-$) is adhered to the surface of the anodic-oxide film 22, and consequently the alumite reacts with the fluorine so that aluminium fluoride 24b is produced on the surface of the anodic-oxide film 22. This aluminium fluoride 24b may function as the core to be used when forming the protruding portions in the process of forming the magnetic film etc.

Figure 4A:
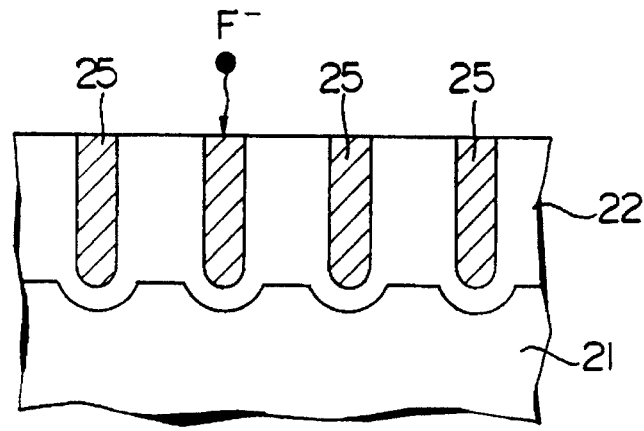
Figure 4B:
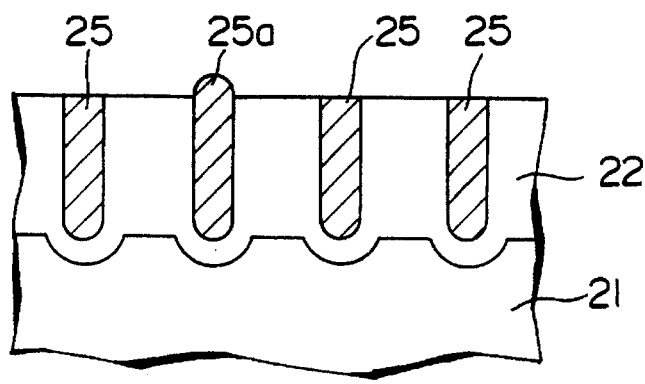

As shown in FIGS. 4A, 4B, the fluorine ($F^-$) reacts with filler metal 25, such as Cu or Sn, which is filled into the pore of the anodic-oxide film 22. Thus, it is possible to produce the compound 25a such as Cu fluoride or Sn fluoride. This compound 25a may function as the core to be used when forming the protruding portions in the process of forming the magnetic film etc.

As described above, the core to be used when forming the protruding portion is formed on the surface of the anodic-oxide film. When forming the magnetic film etc. on the anodic-oxide film by the sputtering process, some of the minute protruding portions are enlarged in size. Thus, some of them can be formed in relatively large size compared to the size of the cell structure of the relatively small alumite. As the foregoing fluorine-containing compound, it is possible to select one of HF, $HBF_4$, $NH_4F$, $NH_4BF_4$, KF and NaF.

[B] Embodiments (1) Configuration and Forming Process

Figure 5:
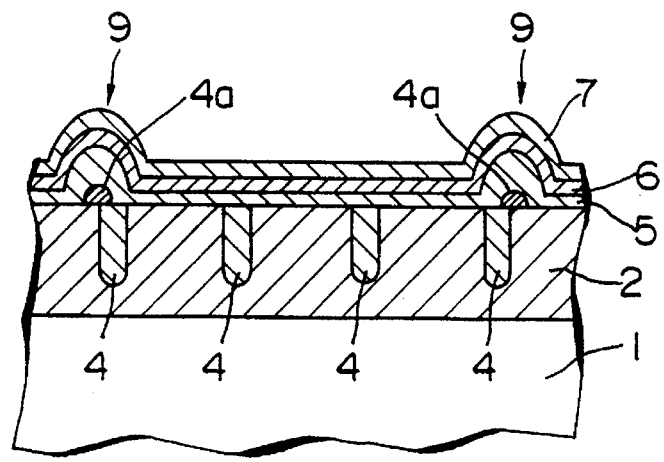
FIG. 5 is a sectional view illustrating a magnetic disk according to an embodiment of the present invention.

FIG. 5 is a sectional view illustrating a magnetic recording medium (hereinafter, simply referred to as the magnetic disk) according to an embodiment of the present invention. Herein, an alumite film 2 is formed on an aluminium substrate 1. In addition, a filler 4 made of the non-magnetic material is buried in each of the pores of the alumite film 2. Further, a Cr film 5, a magnetic film 6 and a protective film 7 are sequentially formed on the alumite film 2 in laminating manner. At some portions of these laminating films, protruding portions 9 are formed around cores 4a which are formed in the vicinity of some of the cell-pores of the alumite film 2. Each of the protruding portions 9 has a diameter smaller than 0.7 μm, and they are formed at the density ranging from $10^2$ to $10^7$ per square millimeter.

In the present embodiment, the protruding portions 9 are formed on the magnetic disk at the relatively low density, which reduces the contact area between the magnetic disk and magnetic head (or head slider) compared to that of the conventional disk. Thus, it is possible to improve the CSS characteristics of the magnetic disk.

As described before, this protruding portion 9 must have a diameter ranging from 0.2 μm to 0.7 μm in order to avoid the reduction of the magnetic recording characteristic, while the height thereof must be lower than 300 Å in order to avoid the deterioration of the head flying characteristic.

Next, description will be given with respect to the process of producing the above-mentioned magnetic disk by referring to FIGS. 6 to 8.

Figure 6:
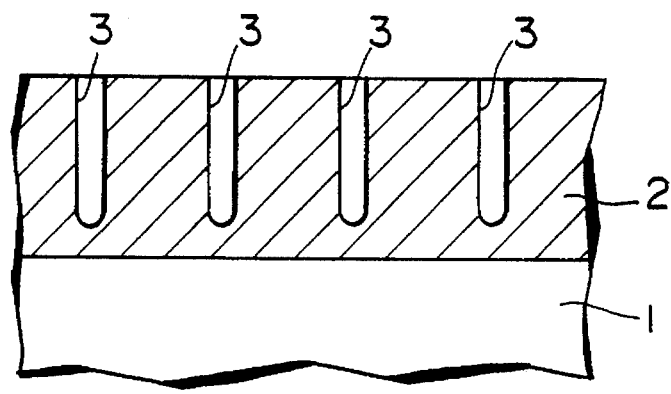
FIGS. 6 to 8 are sectional views each illustrating the process of producing the magnetic disk shown in FIG. 5.
Figure 7:
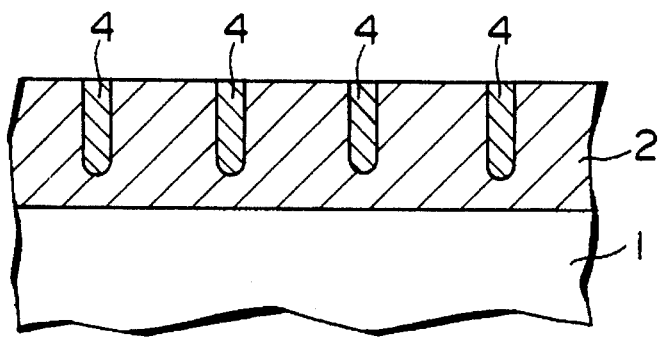

At first, as shown in FIG. 6, the anodic oxidation process is effected on the aluminium substrate 1 so as to form the alumite film 2. Next, as shown in FIG. 7, the filler 4 made of the non-magnetic material such as Cu is electrically deposited in the pore 3 of the alumite film 2. Preferably, such electrolytic deposition of the filler 4 is employed in the present invention. Without the filler 4, it is possible to form the protruding portions. Thereafter, the alumite film 2 is polished.

Figure 8:
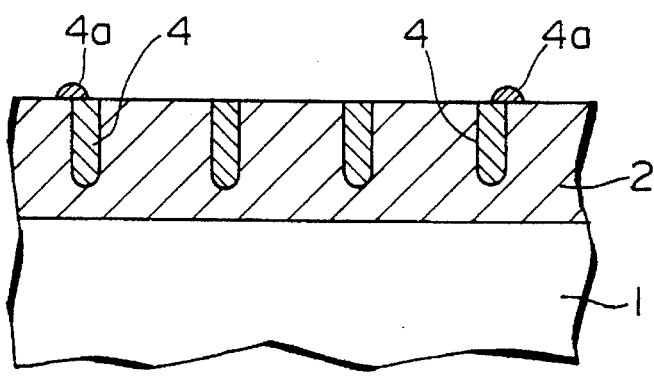

Next, as shown in FIG. 8, the alumite film 2 is treated by use of the fluorine-containing liquid. At this time, some of the fluorine-containing liquid may cause the etching process to be effected on the alumite film 2. In such case, the filler 4 may be slightly protruded onto the surface of the alumite film 2. However, the height of such protrusion is lower than that of the protruding portion which will be formed according to the present invention. Thus, different from the protruding portion, such protrusion does not affect the CSS characteristics at all. Meanwhile, the core 4a which is required when forming the protruding portion is formed on the surface of the alumite film 2. This core 4a may be formed in the vicinity of the cell-pore of the alumite. However, most of the cell-pores are not accompanied with such cores 4a. In other words, the cores 4a are formed in the vicinity of some of the cell-pores. The detailed description will be given later with respect to the mechanism of forming these cores 4a in the vicinity of some of the cell-pores.

Next, as shown in FIG. 5, the sputtering processes are effected by use of Cr, Co—Ni—Cr, C, for example, so that the Cr film 5, magnetic film 6 and protective film 7 are sequentially formed on the alumite film 2. Thus, it is possible to form the protruding portion 9 the size of which is larger than that of the foregoing micro-irregularities to be formed due to the cell-pore structure of the alumite film 2. Then, the production of the magnetic disk according to the present embodiment is completed.

Figure 9:
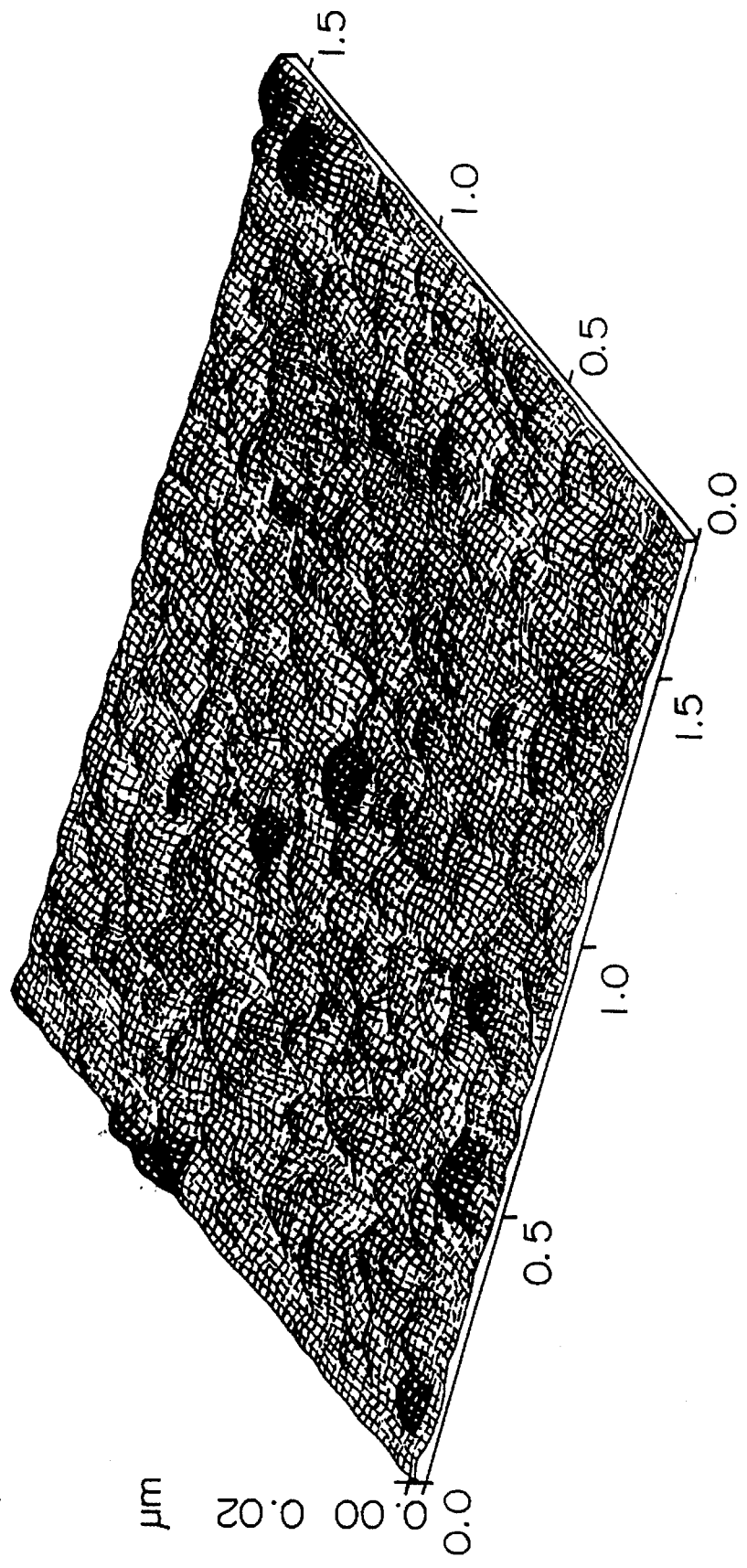
FIG. 9 is a STM-picture drawing illustrating the surface of the magnetic disk according to the embodiment which is observed by the scanning tunnel microscope (STM)
Figure 10:
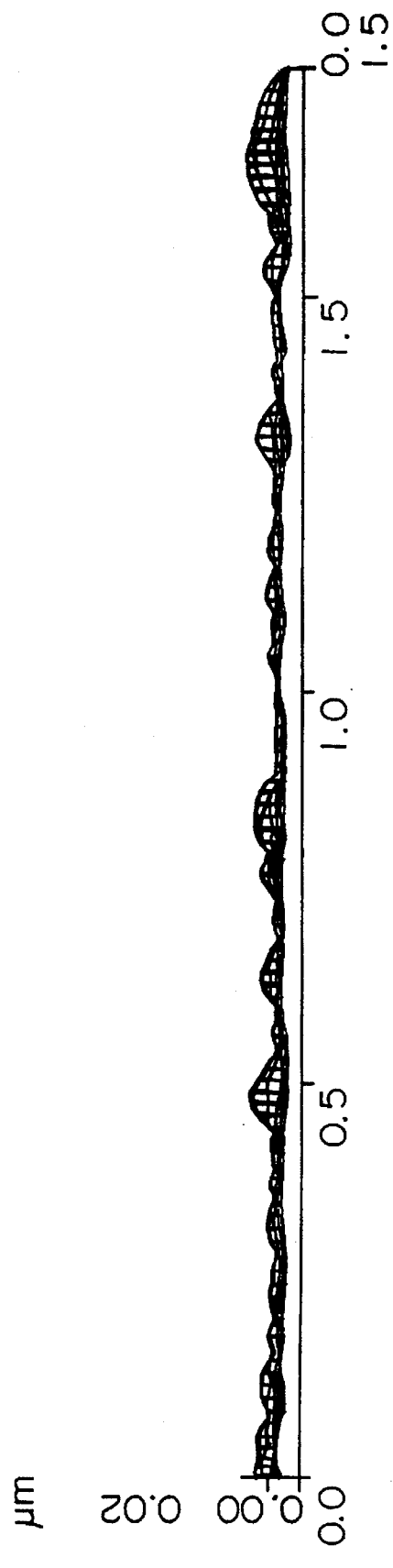
FIG. 10 is a STM-picture drawing corresponding to the sectional view of the magnetic disk according to the embodiment.
Figure 11:
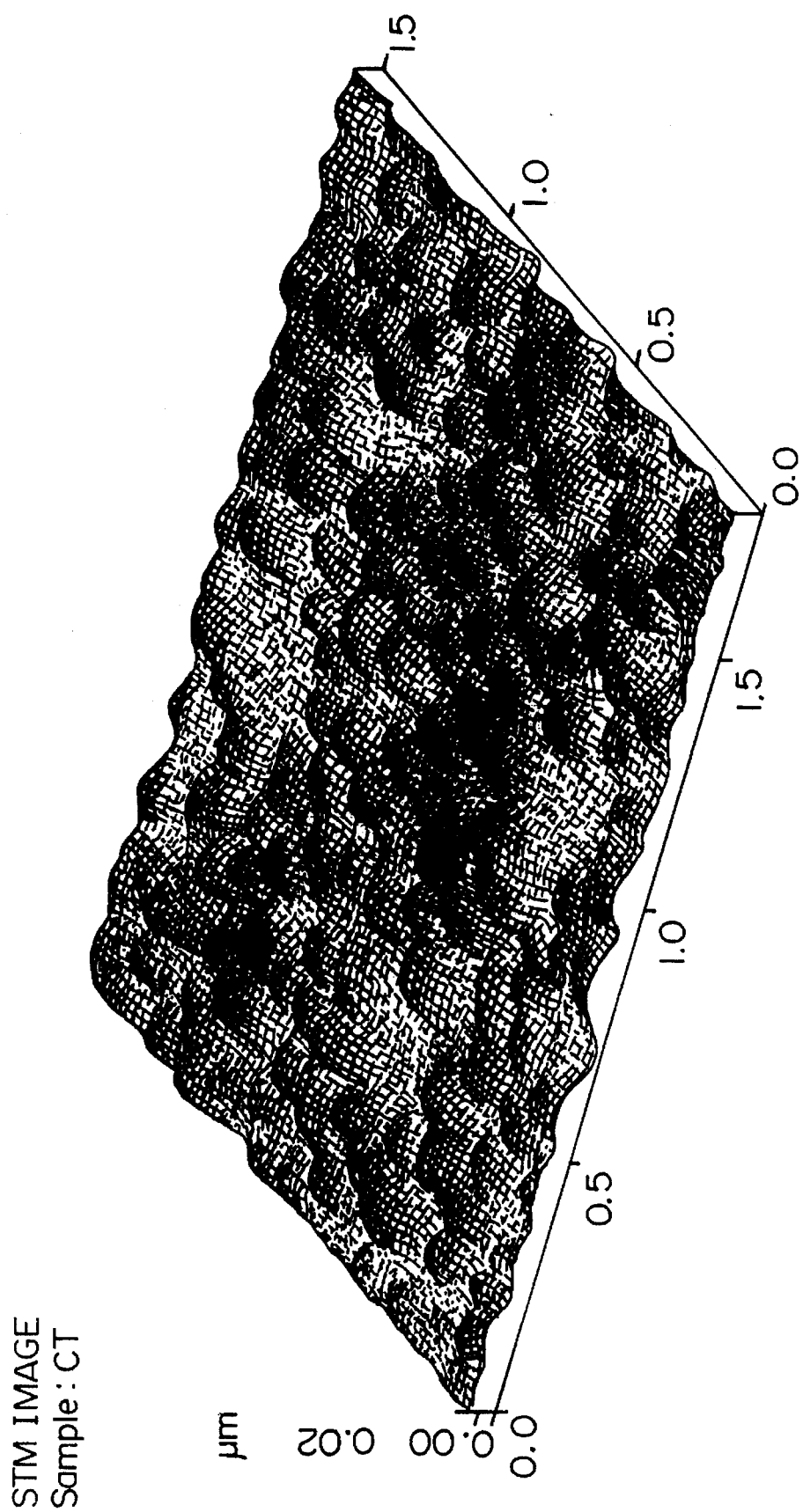
FIG. 11 is a STM-picture drawing illustrating the surface of the conventional magnetic disk.
Figure 12:
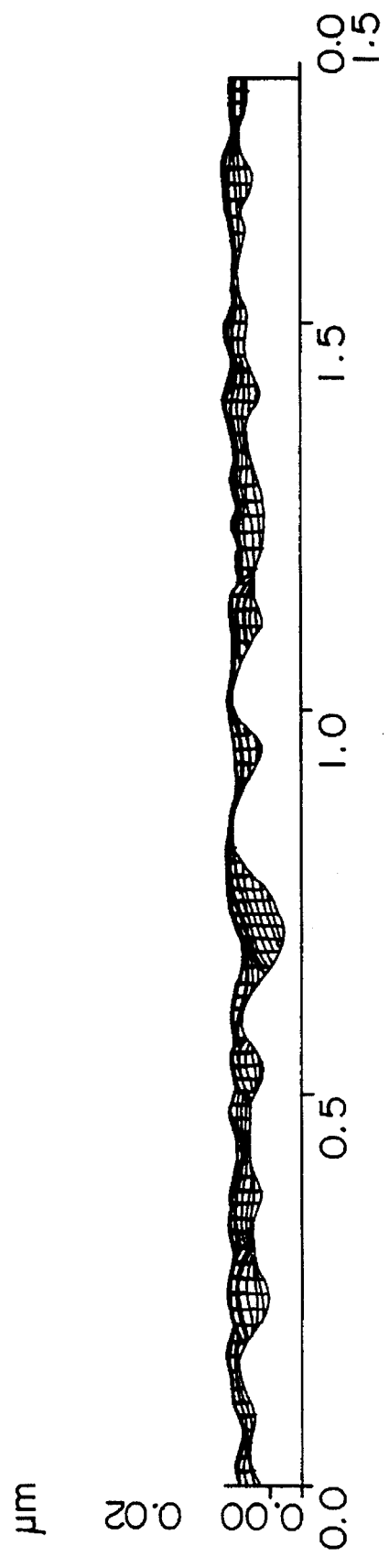
FIG. 12 is a STM-picture drawing corresponding to the sectional view of the conventional magnetic disk.

FIG. 9 is a drawing, obtained by the Scanning Tunnel Microscope (STM), illustrating the surface of the magnetic disk which is produced according to the present embodiment. Similarly, FIG. 10 is a sectional view, obtained by the STM, illustrating the magnetic disk according to the present embodiment. On the other hand, FIG. 11 is a drawing, obtained by the STM, illustrating the surface of the conventional magnetic disk, while FIG. 12 is a sectional view, obtained by the STM, illustrating the conventional magnetic disk. It is apparent from these drawings that the present embodiment can form the protruding portions at the density which is lower than that of the conventional technique.

The above-mentioned embodiment employs the electrolytic deposition of Cu in the pore of the alumite. However, the present invention is not limited to such manner. Without electrically depositing some metal in the pore, it is possible to form the protruding portions at relatively low density as similar to the embodiment.

FIG. 13 is a diagrammatical, sectional view illustrating the magnetic disk according to another embodiment of the present invention. Herein, micro-irregularities 9b which are formed responsive to the cell-pore structure of the alumite film are formed on the surface of the magnetic disk 10, and the other protruding portions 9a, the height of which is higher than that of the micro-irregularities 9b, are further formed at the density ranging from $10^2$ to $10^7$ per one square millimeter.

In this embodiment, the micro-irregularities 9b are further formed in addition to the protruding portions. Therefore, it is possible to obtain the desirable head flying characteristic and the superior CSS characteristics due to the relatively small contact area between the magnetic disk 10 and head slider 11.

(2) Mechanism of Forming the Cores 4a

In the mechanism of forming the protruding portions by use of the liquid into which any one of the acid, base and strong-acid salt is dissolved, it may be considered that the following reactions occurr in the pores.

(a) At first, as shown in FIG. 14A, the filler metal such as Cu is filled into the pore by the electrolytic deposition. However, there is formed a gap between the pore wall and Cu.

(b) When soaking the film in the acid or alkali solution, this solution enters into the above-mentioned gap so that it dissolves the aluminium oxide of the pore wall (see FIG. 14B). This reaction can be represented by the following chemical formula.

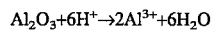

$$Al_2O_3 + 6H^+ \rightarrow 2Al^{3+} + 6H_2O$$

(c) Then, the dissolved Al ion is connected with the base in the solution so as to produce the soluble aluminium salt. For example, nitric aluminium salt is produced in the nitric-acid solution; sulphuric aluminium salt is produced in the sulphuric-acid solution; and fluoric aluminium salt is produced in the hydrofluoric-acid solution. At the same time, under effect of the above-mentioned dissolution, number of $H^+$ ions is reduced, while "pH" in the pore is increased. If some alkali component such as ammonium is contained in the solution, the pH increase is further accelerated.

(d) Accompanied with the pH increase, the aluminium salt produced in the pore is changed to the gelled alumina hydrate. If the solution contains the alkali hydroxide or ammonium hydroxide, the above reaction is accelerated.

(e) In accordance with the above gelatinization of the alumina hydrate, its volume is expanded so that the gelled alumina hydrate is partially pushed up from the gap onto the surface of the alumite film. Thus, the protruding portions are formed (see FIG. 14C).

Thus, the protruding portions are formed by the above-mentioned reactions. In other words, such reactions can be achieved by use of the acid/alkali solution which dissolves the pore wall so as to produce the aluminium salt. However, in order to form the protruding portions finally, two conditions may be required as follows.

(i) In first condition, the solution must not dissolve the filler metal such as Cu, or dissolution speed of Cu must be extremely slow in the solution. If Cu is dissolved, the head portion of Cu is depressed down as shown in FIG. 14D. In such case, even if the alumina hydrate is pushed up from the gap, it is not changed to the protruding portion to be formed on the surface of the alumite film.

(ii) In second condition, the alumina hydrate which is pushed up onto the surface must not be dissolved again to disappear. In general, the alumina gel can be dissolved into the acid/alkali solution. Therefore, when the alumina gel is pushed up onto the surface, it may be simultaneously dissolved into the solution again. For this reason, it is necessary to select the components of the solution so that the dissolution speed of the alumina gel can be slowed down in the solution. Or, it is necessary to proceed the film to the water-washing process in a short period of time.

In the above-mentioned mechanism, it is not necessary to select "Cu" as the filler in the pore. In other words, it is possible to select any one of the metal, inorganic substance and organic substance which can form the gap against the pore wall and which is not dissolved into the solution. If no substance is filled in the pore, the gap is so large that the alumina gel cannot be pushed up onto the surface of the film and consequently the protruding portions are hard to be formed. Similarly, if the filler is tightly filled in the pore so that there is a little gap to be formed between the pore wall and filler, it is difficult for the solution to enter into the pore so that the above-mentioned reactions are avoided and consequently the protruding portions are not formed.

Incidentally, "HCl" or "HNO$_3$" is selected as the acid; "NaOH" is selected as the base; and "(NH$_4$)SO$_4$" is selected as the strong-acid salt in this embodiment, for example.

In the present invention, the solution can contain the following chemicals.
<Inorganic acid>
 Sulfuric Acid $H_2SO_4$
 Nitric Acid $HNO_3$
 Hydrochloric Acid $HCl$
 Hydrofluoric Acid $HF$
 Phosphoric Acid $H_3PO_4$
 Sulfamic Acid $HOSO_2NH_2$
 Chromium Oxide Solution $CrO_2$
<Organic Acid>
 Oxalic Acid $HOOC:COOH$
 Malonic Acid $HOOCCH_2COOH$
 Tartaric Acid $HOOC(CHOH)_2COOH$
 Maleic Acid $HOOCCH:CHCOOH$
 Diglycolic Acid
<Alkali>
 Sodium Hydroxide $NaOH$
 Ammonium Hydroxide $NH_4OH$
<Salt>
 Ammonium Salt
  Ammonium Nitrate $NH_4NO_3$
  Ammonium Sulfate $(NH_4)_2SO_4$
  Ammonium Chloride $NH_4Cl$
  Ammonium Acetate $CH_3COONH_4$
  Ammonium Dihydrogenphosphate $NH_4H_2PO_4$
  Diammonium Hydrogenphosphate $(NH_4)_2HPO_4$
  Ammonium Fluoride $NH_4F$ etc.
 Sodium Salt
  Trisodium Phosphate $Na_3PO_4$
  Sodium Fluoride $NaF$
  Sodium Carbonate $Na_2CO_3$ etc.
In addition, it is possible to use the aqueous solution which contains one of or two or more of the above-described chemicals. In such aqueous solution, it is possible to further add the following chemicals.
 Hydrogen Peroxide $H_2O_2$
 Benzotriazol $C_4H_6N_3$
 Sodium Polyphosphate $Na_{n=2}P_nO_{3n+2}$
 2-Benzothiazolethiol $C_7H_8NS_2$
 Sodium Silicate $Na_2SiO_3$
 Sodium Dichromate $Na_2Cr_2O_7$
 Sodium Nitrite $NaNO_2$

[C] Examples

Next, description will be given with respect to the actual examples which are made in accordance with the present invention. Results of their characteristics will be described later.

(1) Example-1

In this example, Mg is added to Al at purity of 99.9% (i.e., weight-percentage or weight-%) so as to produce the Al alloy substrate containing Mg at 4%.

Next, this aluminium alloy substrate is soaked into the oxalic-acid solution containing the oxalic acid at 4% and it is applied with the power at voltage of 50 V. Thus, the alumite film is formed on the substrate surface.

After effecting the pore-widening process and barrier-layer-adjusting process, Cu is electrically deposited as the filler in the pore of the alumite film.

Next, by use of the alumina powder, the surface of the alumite film is polished smoothly so that its film thickness is reduced to 6 μm.

As the treatment, the mixing liquid containing the hydrofluoric acid at 1% and ammonium fluoride at 4% is used. In such liquid, the substrate is soaked for ten seconds. At this time, temperature of the liquid is maintained at 20° C.

Next, under the condition where the substrate temperature is at 220° C., Cr, Co—Ni—Cr and C are sequentially laminated on the substrate in the sputtering process so as to form the Cr film at 2000 Å, Co—Ni—Cr film at 600 Å and C film at 300 Å. Thereafter, fluorine-containing lubricant is coated on at the width of 20 Å so as to produce the magnetic disk according to this example-1.

(2) Example-2

The magnetic disk according to this example-2 is produced as similar to the foregoing example-1, wherein however, the liquid only containing the hydrofluoric acid at 1% is used as the treating liquid.

(3) Example-3

The magnetic disk according to the example-3 is produced as similar to the foregoing example-1, wherein however, the liquid only containing the ammonium fluoride at 4% is used as the treating liquid.

(4) Example-4

The magnetic disk according to the example-4 is produced as similar to the foregoing example-1, wherein however, "Sn" is used as the filler metal to be filled into the pore of the alumite film.

(5) Example-5

The magnetic disk according to the example-5 is produced as similar to the foregoing example-1, wherein however, the foregoing electrolytic-deposition process is not effected on the alumite film.

(6) Example-6

As similar to the foregoing example-1, the alumite film at film thickness of 10 μm is formed on the substrate surface. After effecting the pore-widening process and barrier-adjusting process, the filler metal "Cu" is electrically deposited in the pore of the alumite film. By use of the alumina powder, the alumite film is polished smoothly so that its film width is reduced to 6 μm. In this state, number of pores in the alumite film is approximately $1 \times 10^8$ per square millimeter, and 80% of the pores are filled with Cu upto their surfaces.

The above-mentioned substrate accompanied with the alumite film is soaked into the aqueous solution containing the hydrochloric acid at 10% for three minutes, wherein temperature of this solution is maintained at 20° C. Thereafter, this substrate is washed by water, and then dried up. After that, when observing the surface of this substrate by the scanning-type electron microscope, we can find the protruding portions to be formed on the substrate surface. In this example, the surface density of them is at $5 \times 10^4$ per square millimeter.

(7) Example-7

This example-7 employs the aqueous solution which contains the nitric acid at 3% and also contains benzotriazole at 0.3%. This benzo-triazole is used as the inhibitor by which Cu is inhibited from being dissolved into the above aqueous solution. After soaking the substrate in this aqueous solution at 20° C. for three minutes, the substrate is washed by water, and then dried up. After that, when observing the substrate surface by the scanning-type electron microscope, we can find the protruding portions to be formed on the substrate surface. At this time, the surface density of them is at $1 \times 10^4$ per square millimeter.

(8) Example-8

This example-8 employs the aqueous solution which contains the sodium hydroxide at 4%. After soaking the substrate into this solution at 20° C. for thirty seconds, the substrate is washed by water, and then dried up. After that, when observing the substrate surface by the scanning-type electron microscope, we can find the protruding portions to be formed on the substrate surface. At this time, the surface density of them is at $1 \times 10^6$ per square millimeter.

(9) Example-9

This example-9 employs the aqueous solution which contains the ammonium sulfate at 5%. After soaking the substrate into this solution at 20° C. for three minutes, the substrate is washed by water, and then dried up. After that, when observing the substrate surface by the scanning-type electron microscope, we can find the protruding portions to be formed on the substrate surface. At this time, the surface density of them is at $2 \times 10^4$ per square millimeter.

(10) Comparative Example

In addition to the above-mentioned ten examples, we provides the comparative example which will be compared to the above ten examples.

In this example, as similar to the foregoing example-1, Mg is added to Al at purity of 99.9% so as to produce the aluminium alloy substrate containing Mg at 4%.

Next, this substrate is soaked into the oxalic-acid solution containing the oxalic acid at 4%, and then applied with the voltage of 50 V. Thus, the alumite film is formed on the substrate surface.

After effecting the pore-widening process and barrier-layer-adjusting process, Cu is electrically deposited in the pores of the alumite film.

Next, by use of the alumina powder, the alumite film is polished smoothly so that its film thickness is reduced to 6 μm.

Next, the chemical process of forming the micro-irregularities is effected by soaking the substrate into the mixed solution containing the phosphoric acid and the chromic acid, so that heights of the protruding portions (or micro-irregularities) will reach 200 Å. Thereafter, the sputtering process is effected on the substrate at 220° C. so that Cr film at 2000 Å, Co—Ni—Cr film at 600 Å and C film at 300 Å are respectively formed on the substrate in laminating manner. After that, the fluorine-containing lubricant is coated on at 20 Å. Thus, the magnetic disk according to the comparative example is produced.

Next, description will be given with respect to the characteristics of the magnetic disks according to the above-mentioned examples in comparison with the magnetic disk according to the comparative example.

Figure 15:
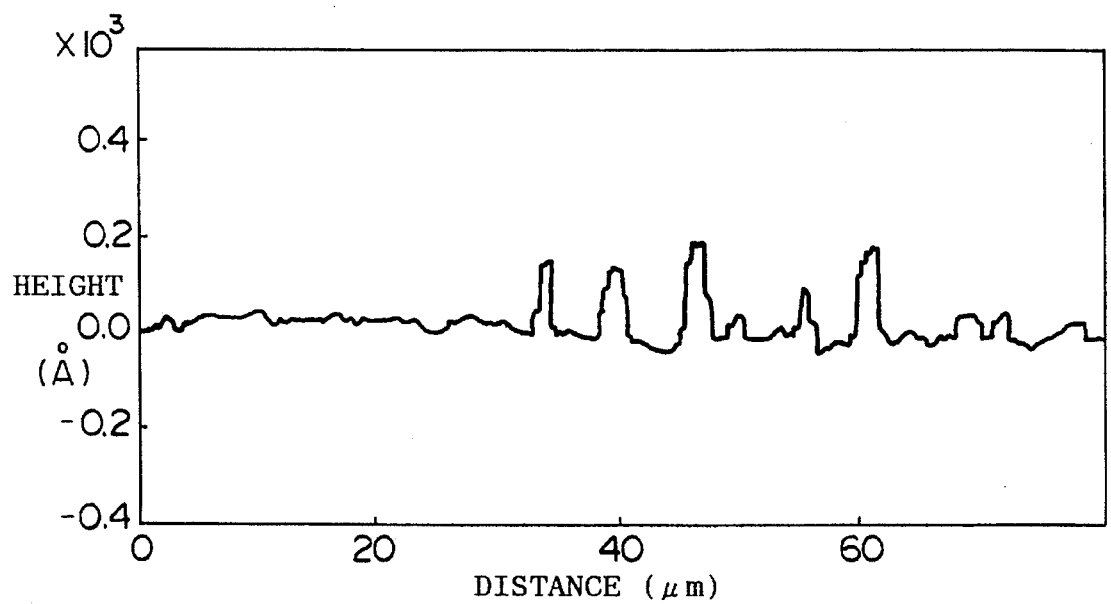
FIG. 15 is a graph showing the surface roughness of the magnetic disk according to the embodiment.
Figure 16:
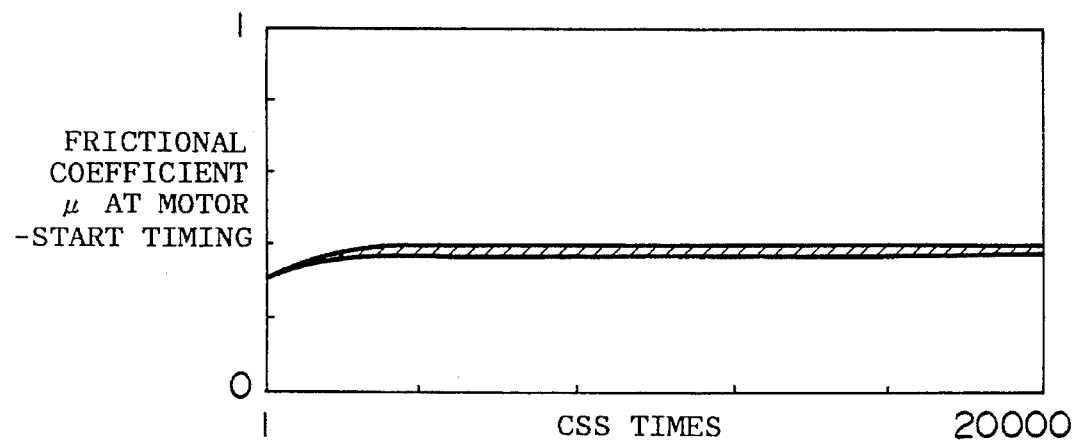
FIG. 16 is a graph showing the results of the CSS testing operations to be carried out on the magnetic disk according to the embodiment.

FIG. 15 is a graph showing the surface roughness of the magnetic disk according to the foregoing embodiment. In the examination of examining the surface roughness of the magnetic disk, we use a surface roughness gauge of which stylus diameter is set equal to or larger than 2.5 μm. It is apparent from this graph that the protruding portions having the approximate height of 200 Å are formed at the relatively low density on the surface of the magnetic disk according to the foregoing embodiment. FIG. 16 is a graph showing the results of the CSS testing operations to be carried out on the magnetic disk according to the foregoing embodiment, wherein horizontal axis represents "CSS times" (by which the CSS operations are repeatedly made), while vertical axis represents "frictional coefficient μ". It is apparent from this graph that in the present magnetic disk, the frictional coefficient μ is at extremely low level, i.e., approximately at "0.4" after carrying out the CSS testing operations by twenty thousand times. Thus, the present magnetic disk demonstrates the desirable CSS characteristics.

Figure 17:
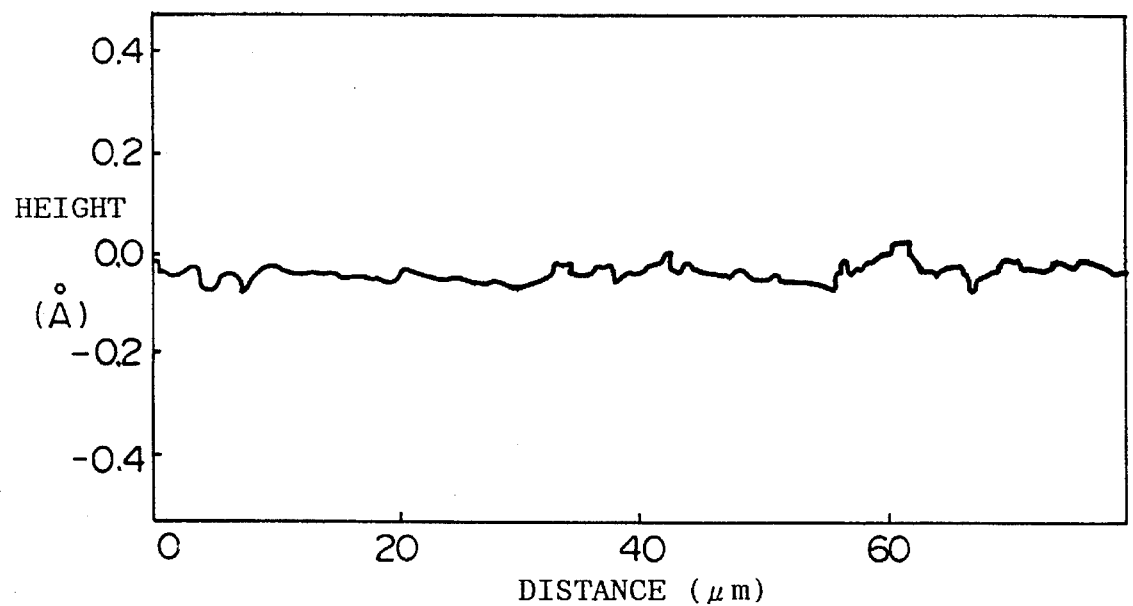
FIG. 17 is a graph showing the surface roughness of the magnetic disk according to the comparative example.
Figure 18:
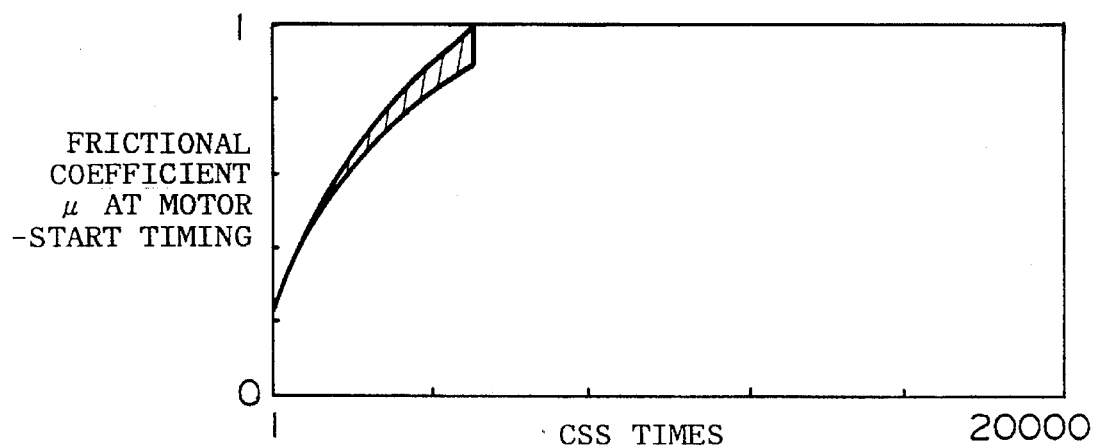
FIG. 18 is a graph showing the results of the CSS testing operations to be carried out on the magnetic disk according to the comparative example.

FIG. 17 is a graph showing the surface roughness of the magnetic disk according to the foregoing comparative example. It can be read from FIG. 17 that in this comparative magnetic disk, micro-irregularities are formed but larger protruding portions are not formed. FIG. 18 is a graph showing the results of the CSS testing operations to be carried out on the comparative magnetic disk, wherein horizontal axis represents the CSS times, while vertical axis represents the frictional coefficient μ. It can be read from FIG. 18 that in the comparative magnetic disk, the frictional coefficient μ exceeds its limit value "1" after carrying out the CSS testing operations by five thousand times. This means that the comparative magnetic disk is inferior to the magnetic disk of the foregoing embodiment in the CSS characteristics.

Next, we examine the relationship between the processing conditions and density/size of the protruding portions.

Figure 19:
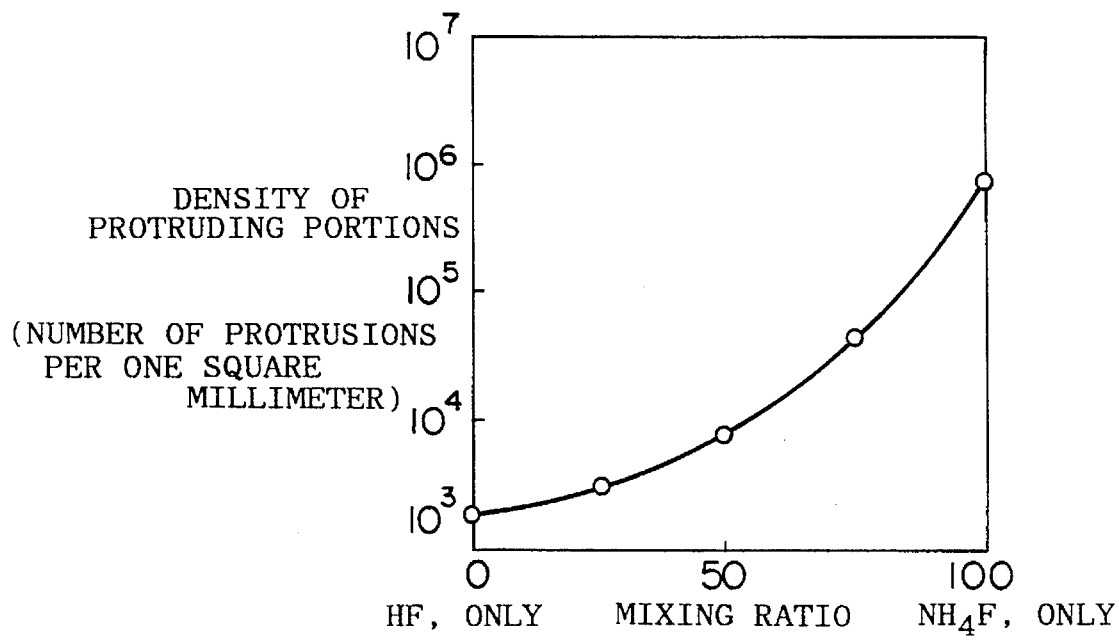
FIG. 19 is a graph showing the relationship between the composition of the solution and density of the protruding portions.

FIG. 19 is a graph showing the relationship between the composition of the processing solution and density of the protruding portions, wherein horizontal axis represents the mixing ratio between the hydrofluoric acid (HF) and ammonium fluoride ($NH_4F$), while vertical axis represents the density of the protruding portions. Herein, the total density of HF and $NH_4F$ is set at 5%. It can be read from FIG. 19 that by adequately controlling the mixing ratio of them, desirable density of the protruding portions can be obtained.

Figure 20:
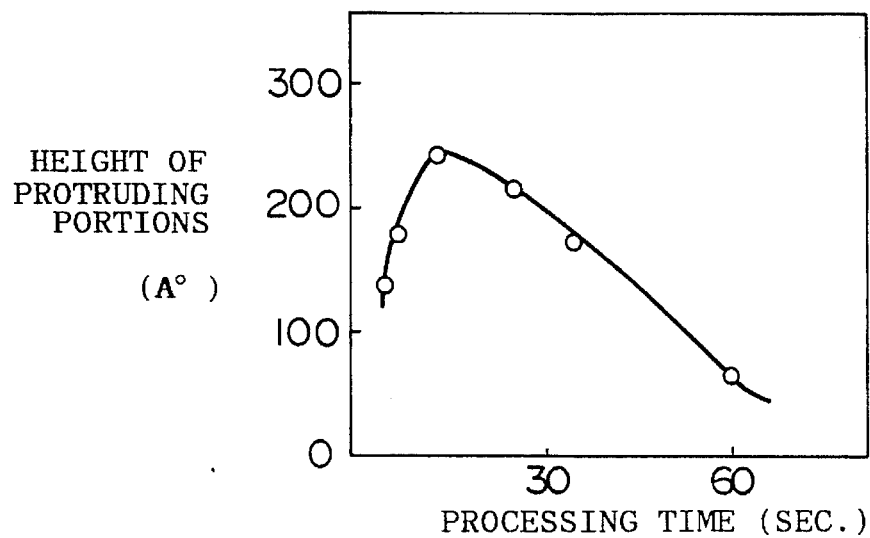
FIG. 20 is a graph showing the relationship between the processing time and height of the protruding portion.

FIG. 20 is a graph showing the relationship between the processing time and height of the protruding portion, wherein horizontal axis represents the processing time by which the substrate is processed in the solution containing the hydrofluoric acid at 1% and ammonium fluoride at 4%, while vertical axis represents the height of the protruding portion. It can be read from FIG. 20 that by adequately selecting the processing time, desirable height of the protruding portion can be obtained.

In the foregoing embodiment, the alumite film is processed by the solution containing the fluorine. However, the same effects can be obtained even if the alumite film is processed by gas containing fluorine. As the filler to be filled into the pore of the alumite film, it is possible to employ the polymer and the like, other than the non-magnetic metal such as Cu.

Next, description will be given with respect to the results of the CSS testing operations to be carried out on the magnetic disks each having the different density of the protruding portions.

Herein, we produce the magnetic disks of which density of the protruding portions is ranging from $10^1$ to $10^8$ per square millimeter with respect to each of the foregoing embodiment and comparative example, and then we made the CSS testing operations on these magnetic disks respectively. At this test, the limit CSS times of each magnetic disk is defined as the times of the CSS testing operation which is terminated when the maximum frictional coefficient μ between the head and disk at the motor-start timing exceeds over "1". In addition, the maximum CSS times is limited to twenty thousand times with respect to each magnetic disk. The results are shown in FIG. 21.

Figure 21:
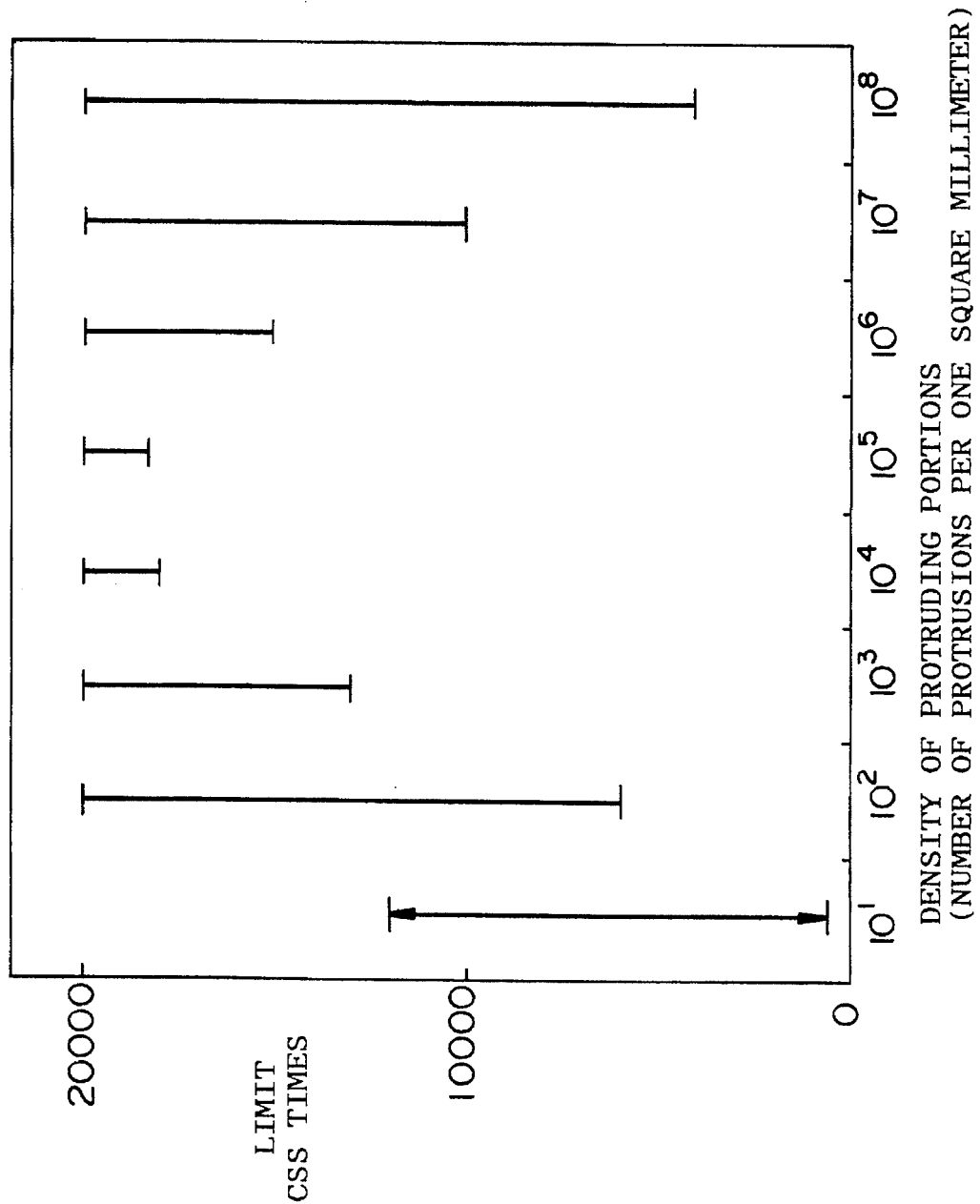
FIG. 21 is a graph showing the relationship between the density of the protruding portions and CSS times.

As shown in FIG. 21, some of the magnetic disks having the protruding portions at the density of $10^2$ per square millimeter have the relatively large CSS times which is larger than twenty thousand times. Incidentally, the density of the protruding portions is measured by use of the scanning-type electron microscope (SEM), scanning-type tunnel microscope (STM) or scanning-type atomic force microscope (AFM) which observes the surface condition of the substrate before the sputtering process or disk after the sputtering process.

Figure 22:
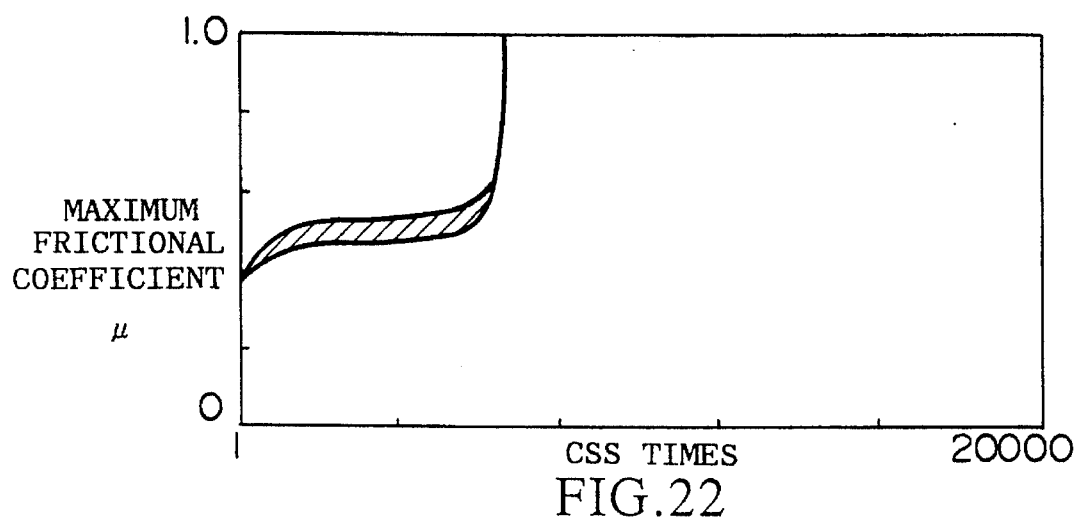
FIGS. 22 to 24 are graphs each showing the CSS characteristics of the magnetic disk having the different density of the protruding portions.

FIG. 22 is a graph showing the CSS characteristics of the magnetic disk having the protruding portions at the density of $5\times10^2$ per square millimeter, wherein horizontal axis represents the CSS times, while vertical axis represents the maximum frictional coefficient μ at the motor-start timing at which the motor for revolving the magnetic disk is started in the hard-disk unit and the like. In case of the magnetic disk having the protruding portions at the density ranging from $10^2$ to $10^3$ per square millimeter, as shown in FIG. 22, there is a great dispersion of the CSS characteristics. Particularly, the maximum frictional coefficient is remained at the low level, however, it is rapidly raised up over "1" when the CSS times exceeds over certain value.

Figure 23:
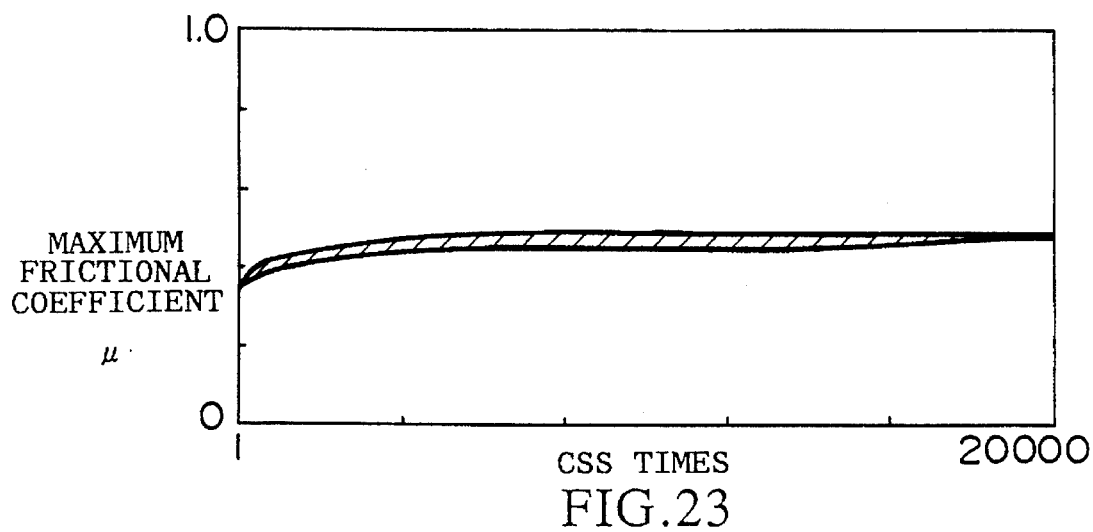

FIG. 23 is a graph showing the CSS characteristics of the magnetic disk having the protruding portions at the density of $3\times10^5$ per square millimeter, wherein horizontal axis represents the density of the protruding portions, while vertical axis represents the maximum frictional coefficient μ at the motor-start timing. In case of the magnetic disk having the protruding portions at the density ranging from $10^4$ to $10^6$ per square millimeter, as shown in FIG. 23, it is possible to obtain the superior CSS characteristics.

Figure 24:
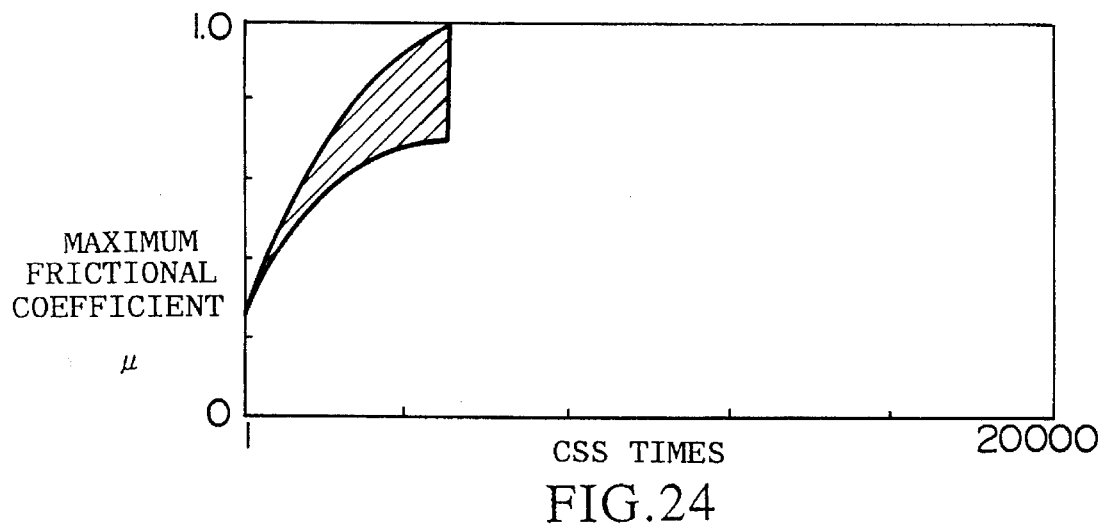

FIG. 24 is a graph showing the CSS characteristics of the magnetic disk having the protruding portions at the density of $5\times10^6$ per square millimeter, wherein horizontal axis represents the CSS times, while vertical axis represents the maximum frictional coefficient μ at the motor-start timing. In case of the magnetic disk having the protruding portions at the density exceeding $10^6$ per one square millimeter, as shown in FIG. 24, there is a great dispersion of the CSS characteristics. In some cases, the maximum frictional coefficient monotonously increases and exceeds over "1". Particularly, when the density exceeds $10^7$ per square millimeter, dispersion of the CSS characteristics becomes greater.

On the basis of the above-mentioned results of the CSS testing operations, in order to obtain the magnetic disk having the superior CSS characteristics, density of the protruding portions must be in a range from $10^2$ to $10^7$ per square millimeter. Preferably, such density must be in a range from $10^4$ to $10^6$ per square millimeter.

As described heretofore, according to the present invention, the protruding portions having the height which is higher than that of the micro-irregularities to be formed due to the cell-pore structure of the anodic-oxide film are formed on the surface of the anodic-oxide film at the predetermined density. Therefore, it is possible to obtain the desirable head flying characteristic and superior CSS characteristics.

Further, after forming the anodic-oxide film on the substrate surface, this anodic-oxide film is simply processed by the fluorine-containing liquid or gas. For this reason, it is possible to produce the magnetic recording medium having the above protruding portions with ease.

Lastly, this invention may be practiced or embodied in still other ways without departing from the spirit or essential character thereof as described heretofore. Therefore, the preferred embodiments and examples described herein are illustrative and not restrictive, the scope of the invention being indicated by the appended claims and all variations which come within the meaning of the claims are intended to be embraced therein.

What is claimed is:

1. A magnetic recording medium comprising:

(a) an aluminum-containing layer;

(b) an anodic-oxidation film on a surface of said layer, said anodic-oxidation film having defined therein a plurality of cell-pores in each of which a filler material is deposited;

(c) a plurality of cores comprising a product of a reaction between a reagent selected from the group consisting of
      (i) a solution comprising fluorine,
      (ii) a solution comprising an acid but not comprising fluorine,
      (iii) a solution comprising a base but not comprising fluorine,
      (iv) a solution comprising a strong-acid salt but not comprising fluorine, and
      (v) a gas comprising fluorine and at least one of said anodic-oxidation film and said filler material, said reaction product being a substance different from said filler material and from the substance used to form said aluminum-containing layer, said cores being formed on a surface of said anodic-oxide film in the vicinity of a portion of said plurality of cell-pores, wherein the height of said cores is less than 300 Å, the diameter of said cores is less than about 0.7 µm, and the number of said cores is smaller than the number of said cell-pores;

(d) a metal bed film deposited on said anodic-oxidation film; and (e) a magnetic film deposited on said metal bed film, said magnetic film having a plurality of surface irregularities produced by said plurality of cores, wherein the surface density of said surface irregularities ranges from $10^2$ to $10^7$ per square millimeter.

2. A magnetic recording medium according to claim 1 wherein said aluminum-containing layer is made of aluminum or an aluminum alloy.

3. A magnetic recording medium according to claim 1 wherein said anodic-oxidation film is an alumite film.

4. A magnetic recording medium according to claim 1 wherein the surface density of said surface irregularities is $10^2$ to $10^6$ per square millimeter.

5. A magnetic recording medium according to claim 1, said magnetic film further having a plurality of micro-irregularities formed in response to said cell-pores in said anodic-oxide film, wherein the height of said surface irregularities is higher than the height of said micro-irregularities and the surface density of said surface irregularities is lower than the surface density of said micro-irregularities.

6. A magnetic recording medium according to claim 1 wherein said filler material is a non-magnetic substance.

7. A magnetic recording medium according to claim 1 wherein said metal bed film comprises Cr.

8. A magnetic recording medium according to claim 1 further comprising a protective layer deposited on said magnetic film.

9. A magnetic recording medium according to claim 1 wherein said aluminum-containing layer is formed on a glass bed.

10. A magnetic recording medium according to claim 1 wherein said aluminum-containing layer is an aluminum layer.

11. A magnetic recording medium according to claim 4 wherein the surface density of said surface irregularities is $10^4$ to $10^6$ per square millimeter.

12. A substrate for a magnetic recording medium comprising:

(a) an aluminum-containing layer;

(b) an anodic-oxidation film on a surface of said layer, said anodic-oxidation film having defined therein a plurality of cell-pores in each of which a filler material is deposited; and (c) a plurality of cores comprising a product of a reaction between a reagent selected from the group consisting of
 (i) a solution comprising fluorine,
 (ii) a solution comprising an acid but not comprising fluorine,
 (iii) a solution comprising a base but not comprising fluorine,
 (iv) a solution comprising a strong-acid salt but not comprising fluorine, and
 (v) a gas comprising fluorine and at least one of said anodic-oxidation film and said filler material, said reaction product being a substance different from said filler material and from the substance used to form said aluminum-containing layer, said cores being formed on a surface of said anodic-oxide film in the vicinity of a portion of said plurality of cell-pores, wherein the height of said cores is less than 300 Å, the diameter of said cores is less than about 0.7 µm, the surface density of said cores ranges from $10^2$ to $10^7$ per square millimeter, and the number of said cores is smaller than the number of said cell-pores.

13. A substrate according to claim 12 wherein said aluminum-containing layer is made of aluminum or an aluminum alloy.

14. A substrate according to claim 12 wherein said anodic-oxidation film is an alumite film.

15. A substrate according to claim 12 wherein the surface density of said cores ranges from $10^2$ to $10^6$ per square millimeter.

16. A substrate according to claim 12 wherein the surface density of said cores ranges from $10^4$ to $10^6$ per square millimeter.

17. A substrate according to claim 12 wherein said filler material is a non-magnetic substance.

18. A method of producing a magnetic recording medium comprising the steps of:

(a) effecting an anodic oxidation process on an aluminum-containing layer to form an anodic-oxidation film on said aluminum-containing layer, said anodic-oxidation film having defined therein a plurality of cell-pores;

(b) depositing a filler material in said cell-pores;

(c) treating said anodic-oxidation film with a reagent to form a plurality of cores in the vicinity of a portion of said plurality of pores, wherein the height of said cores is less than 300 Å, the diameter of said cores is less than about 0.7 µm, the surface density of said cores ranges from $10^2$ to $10^7$ per square millimeter, and the number of said cores is less than the number of said cell-pores, said reagent being selected from the group consisting of
 (i) a solution comprising fluorine,
 (ii) a solution comprising an acid but not comprising fluorine,
 (iii) a solution comprising a base but not comprising fluorine,
 (iv) a solution comprising a strong-acid salt but not comprising fluorine, and
 (v) a gas comprising fluorine;

(d) depositing a metal bed film on said anodic-oxidation film; and (e) depositing a magnetic film on said metal bed film.

19. A method according to claim 18 wherein reagent (i) comprises a compound selected from the group consisting of HF, $HBF_4$, $NH_4F$, $NH_4BF_4$, KF and NaF.

20. A method according to claim 18 wherein said reagent (ii) comprises an acid selected from the group consisting of sulfuric acid, nitric acid, hydrochloric acid, phosphoric acid, sulfamic acid, chromium oxide solution, oxalic acid, malonic acid, tartaric acid, maleic acid and diglycolic acid.

21. A method according to claim 18 wherein said reagent (iii) comprises sodium hydroxide or ammonium hydroxide.

22. A method according to claim 18 wherein said reagent (iv) comprises a compound selected from the group consisting of ammonium nitrate, ammonium sulfate, ammonium chloride, ammonium acetate, ammonium dihydrogenphosphate, diammonium hydrogenphosphate, trisodium phosphate and sodium carbonate.

23. A method according to claim 18 wherein said reagent is selected from the group consisting of reagent (ii), reagent (iii) and reagent (iv) and further comprises a compound selected from the group consisting of hydrogen peroxide, benzotriazole, sodium polyphosphate, 2-benzothiazolethiol, sodium silicate, sodium dichromate and sodium nitrite.

24. A method according to claim 18 wherein the surface density of said cores ranges from $10^2$ to $10^6$ per square millimeter.

25. A method according to claim 18 wherein the surface density of said cores ranges from $10^4$ to $10^6$ per square millimeter.

26. A method according to claim 18 further comprising the step of polishing a surface of said anodic-oxidation film after said depositing step such that said surface is substantially smooth.

27. A method according to claim 18 wherein said filler material is a non-magnetic substance.

28. A method according to claim 18 further comprising the step of depositing a protective layer on said magnetic film.

29. A magnetic recording medium produced according to the method of claim 18.

30. A magnetic recording medium produced according to the method of claim 28.

31. A method of producing a substrate for a magnetic recording medium comprising the steps of:
   (a) effecting an anodic oxidation process on an aluminum-containing layer to form an anodic-oxidation film on said aluminum-containing layer, said anodic-oxidation film having defined therein a plurality of cell-pores;
   (b) depositing a filler material in said cell-pores; and
   (c) treating said anodic-oxidation film with a reagent to form a plurality of cores in the vicinity of a portion of said plurality of pores, wherein the height of said cores is less than 300 Å, the diameter of said cores is less than about 0.7 μm, the surface density of said cores ranges from $10^2$ to $10^7$ per square millimeter, and the number of said cores is less than the number of said cell-pores, said reagent being selected from the group consisting of
      (i) a solution comprising fluorine,
      (ii) a solution comprising an acid but not comprising fluorine,
      (iii) a solution comprising a base but not comprising fluorine,
      (iv) a solution comprising a strong-acid salt but not comprising fluorine, and
      (v) a gas comprising fluorine.

32. A method according to claim 31 wherein reagent (i) comprises a compound selected from the group consisting of HF, $HBF_4$, $NH_4F$, $NH_4BF_4$, KF and NaF.

33. A method according to claim 31 wherein said reagent (ii) comprises an acid selected from the group consisting of sulfuric acid, nitric acid, hydrochloric acid, phosphoric acid, sulfamic acid, chromium oxide solution, oxalic acid, malonic acid, tartaric acid, maleic acid and diglycolic acid.

34. A method according to claim 31 wherein said reagent (iii) comprises sodium hydroxide or ammonium hydroxide.

35. A method according to claim 31 wherein said reagent (iv) comprises a compound selected from the group consisting of ammonium nitrate, ammonium sulfate, ammonium chloride, ammonium acetate, ammonium dihydrogenphosphate, diammonium hydrogenphosphate, trisodium phosphate and sodium carbonate.

36. A method according to claim 31 wherein said reagent is selected from the group consisting of reagent (ii), reagent (iii) and reagent (iv) and further comprises a compound selected from the group consisting of hydrogen peroxide, benzotriazole, sodium polyphosphate, 2-benzothiazolethiol, sodium silicate, sodium dichromate and sodium nitrite.

37. A method according to claim 31 wherein the surface density of said cores ranges from $10^2$ to $10^6$ per square millimeter.

38. A method according to claim 31 wherein the surface density of said cores ranges from $10^4$ to $10^6$ per square millimeter.

39. A method according to claim 31 further comprising the step of polishing a surface of said anodic-oxidation film after said depositing step such that said surface is substantially smooth.

40. A method according to claim 31 wherein said filler material is a non-magnetic substance.

41. A substrate produced according to the method of claim 31.

42. A magnetic recording medium comprising:
   an aluminum-containing layer;
   an anodic-oxidation film on a surface of said layer, said anodic-oxidation film having defined therein a plurality of cell-pores in each of which a filler material is deposited; and
   a plurality of cores comprised of a substance different from said filler material and from the substance used to form said aluminum-containing layer, said cores being formed on a surface of said anodic-oxidation film in the vicinity of a portion of said plurality of cell-pores, wherein the height of said cores is less than 300 Å, the diameter of said cores is less than about 0.7 μm, and the number of said cores is smaller than the number of said cell-pores;
   a metal bed film deposited on said anodic-oxidation film; and
   a magnetic film deposited on said metal bed film, said magnetic film having a plurality of surface irregularities produced by said plurality of cores, wherein the surface density of said surface irregularities ranges form $10^2$ to $10^7$ per square millimeter.

43. A substrate for a magnetic recording medium comprising:
   an aluminum-containing layer;
   an anodic-oxidation film on a surface of said layer, said anodic-oxidation film having defined therein a plurality of cell-pores in each of which a filler material is deposited; and
   a plurality of cores comprised of a substance different form said filler material and from the substance used to form said aluminum-containing layer, said cores being formed on a surface of said anodic-oxidation film in the vicinity of a portion of said plurality of cell-pores,
   wherein the height of said cores is less than 300 Å, the diameter of said cores is less than about 0.7 μm, the surface density of said cores ranges from $10^2$ to $10^7$ per square millimeter, and the number of said cores is smaller than the number of said cell-pores.

44. A substrate for a magnetic recording medium having surface irregularities comprising:
   an aluminum-containing layer;
   an anodic-oxidation film on a surface of said aluminum-containing layer, said anodic-oxidation film having a plurality of cell-pores defined therein; and
   a plurality of cores provided in the vicinity of edges of at least a portion of said plurality of cell-pores for causing surface irregularities on said magnetic recording medium, wherein the height of said core is less than 300 Å, the diameter of said cores is less than about 0.7 μm, the surface density of said cores ranges from $10^2$ to $10^7$ per square millimeter, and the number of said cores is less than the number of said cell-pores.

45. A method of producing a magnetic recording medium comprising the steps of:

effecting an anodic oxidation process on an aluminum-containing layer to form an anodic-oxidation film on said aluminum-containing layer, said anodic-oxidation film having defined therein a plurality of cell-pores;

depositing a filler material in said cell-pores;

treating said anodic-oxidation film with a solution or fluorine-containing gas to form a plurality of cores in the vicinity of a portion of said plurality of pores, wherein the height of said cores is less than 300 Å, the diameter of said cores is less than about 0.7 μm, the surface density of said cores ranges from $10^2$ to $10^7$ per square millimeter, and the number of said cores is less than the number of said cell-pores;

depositing a metal bed form on said anodic-oxidation film; and depositing a magnetic film on said metal bed film.

46. A magnetic recording medium produced according to the method of claim 45.

47. A method of producing a substrate for a magnetic recording medium comprising the steps of:

effecting an anodic oxidation process on an aluminum-containing layer to form an anodic-oxidation film on said aluminum-containing layer, said anodic-oxidation film having defined therein a plurality of cell-pores;

depositing a filler material in said cell-pores; and treating said anodic-oxidation film with a solution or gas to form a plurality of cores in the vicinity of a portion of said plurality of pores, wherein the height of said cores is less than 300 Å, the diameter of said cores is less than about 0.7 μm, the surface density of said cores ranges from $10^2$ to $10^7$ per square millimeter, and the number of said cores is less than the number of said cell-pores.

48. A substrate produced according to the method of claim 47.

* * * * *